US009621073B1

(12) United States Patent
Liu et al.

(10) Patent No.: US 9,621,073 B1
(45) Date of Patent: Apr. 11, 2017

(54) 1MHZ SCALABLE CASCADED Z-SOURCE INVERTER USING GALLIUM NITRIDE (GAN) DEVICE

(75) Inventors: Liming Liu, Tallahassee, FL (US); Hui Li, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 1020 days.

(21) Appl. No.: 13/601,364

(22) Filed: Aug. 31, 2012

Related U.S. Application Data

(60) Provisional application No. 61/529,602, filed on Aug. 31, 2011.

(51) Int. Cl.

*H02J 1/10* (2006.01)
*H02M 7/5387* (2007.01)

(52) U.S. Cl.

CPC .......... *H02M 7/53871* (2013.01); *H02J 1/10* (2013.01)

(58) Field of Classification Search

CPC .............................. H02M 7/53871; H02J 1/10
USPC ...................................................... 307/75, 82
See application file for complete search history.

(56) References Cited

U.S. PATENT DOCUMENTS 4,052,657 A * 10/1977 Kleiner .................. H02M 7/49 363/43
5,949,668 A * 9/1999 Schweighofer .... G01R 33/3852 363/136
6,239,997 B1 * 5/2001 Deng .............................. 363/95
7,808,125 B1 * 10/2010 Sachdeva ................ H02M 7/49 307/30
8,503,200 B2 * 8/2013 Chapman ................ H02J 3/383 363/131
8,772,965 B2 * 7/2014 El-Barbari .............. H02J 3/383 307/71
8,842,454 B2 * 9/2014 Johnson et al. ................ 363/71
9,257,848 B2 * 2/2016 Coccia .................... H02J 3/383
2003/0231518 A1 * 12/2003 Peng .............................. 363/98
2006/0140644 A1 * 6/2006 Paolella ........................ 398/189
2008/0143188 A1 * 6/2008 Adest ...................... H02J 1/102 307/82
2008/0144342 A1 * 6/2008 Du et al. ......................... 363/71
2009/0066271 A1 * 3/2009 Kajouke et al. .............. 318/139

(Continued)

FOREIGN PATENT DOCUMENTS

CN 201682294 U * 12/2010

OTHER PUBLICATIONS

English machine translation of CN 201682294; Gao et al; Dec. 2012.*

(Continued)

*Primary Examiner* — Adi Amrany
(74) *Attorney, Agent, or Firm* — Molly L. Sauter; Smith & Hopen, P.A.

(57) ABSTRACT

The scalable cascaded Z-source inverter is able to interface flexibly different distributed renewable energy sources or storages in wide voltage change range, such as wind power, solar power, battery, fuel cell, Ultra-capacitor and so on. The invention facilitates the AC 1 MHz frequency output; therefore high power density can be reached. Z-source network is integrated in each inverter module to wide system operation range, improve high system efficiency, and enhance high system reliability. The invention is applied for PV system to verify the performance.

10 Claims, 11 Drawing Sheets

(56) References Cited

U.S. PATENT DOCUMENTS

| | | | | |
|---|---|---|---|---|
| 2010/0073969 | A1* | 3/2010 | Rajagopalan et al. | 363/37 |
| 2010/0085787 | A1* | 4/2010 | Kane et al. | 363/123 |
| 2011/0204851 | A1* | 8/2011 | Manotas, Jr. | 320/128 |
| 2011/0273917 | A1* | 11/2011 | Maitra et al. | 363/74 |
| 2012/0175964 | A1* | 7/2012 | Yoscovich | H02J 3/383<br>307/82 |
| 2012/0313442 | A1* | 12/2012 | Oh | H02J 3/383<br>307/82 |
| 2013/0027997 | A1* | 1/2013 | Tan | G05F 1/67<br>363/95 |
| 2013/0187473 | A1* | 7/2013 | Deboy | H02M 7/49<br>307/82 |

OTHER PUBLICATIONS

Calais et al, "A Transformerless Five Level Cascaded Inverter Based Single Phase Photovoltaic System", 2000, IEEE, pp. 1173-1178.*

* cited by examiner

1MHZ SCALABLE CASCADED Z-SOURCE INVERTER USING GALLIUM NITRIDE (GAN) DEVICE

CROSS REFERENCE TO RELATED APPLICATIONS

This application claims priority from U.S. Provisional Application No. 61/529,602 filed on Aug. 31, 2011, entitled "1 MHZ Scalable Cascaded Z-Source Inverter Using Gallium Nitride (GAN) Device".

STATEMENT OF GOVERNMENT INTEREST

This invention was made with Government support under Grant No. 1124658 awarded by NSF (National Science Foundation) GOALI grant, entitled, "1 MHz, GaN-Based, Modular, Cascaded Z-Source Inverters for Scalable Grid-Interactive Photovoltaic (PV) Applications". The Government has certain rights in the invention.

FIELD OF INVENTION

This invention relates to an inverter, more specifically, a scalable cascaded Z-source inverter.

BACKGROUND OF INVENTION

Department Of Energy requests $2.4 billion for renewable energy, efficiency in fiscal year 2011. The proposed budget boosts renewable energy sources and storages application and development, such as wind power, solar power, batteries, and fuel cells and so on. There is the widespread growth of distributed energy systems using these renewable energy sources and storages. More and more attention is paid to the high power density, high power efficiency, high power quality and high system reliability of the distributed energy systems.

The main reason that prevents the grid-connected photovoltaic (PV) systems from realizing its full market potential is the power losses due to the module mismatch, orientation mismatch, partial shading, and maximum power point tracking (MPPT) inefficiencies. The traditional cascaded dc-dc converter topology shown in FIG. 1 can interface distributed PV modules and achieve MPPT for each PV module, therefore reduces the power loss. However, the configuration has dc-dc and dc-ac conversion stages, which decrease the overall system efficiency. Moreover, the switching frequency of dc-ac inverter is limited leading to the big size AC filter and large electrolyte capacitors, which restricts the system power quality and power density. Cascaded multilevel inverter topology such as H-bridge inverter, shown in FIG. 2, can interface distributed PV modules, achieve MPPT for each PV module and single stage energy conversion, support a higher equivalent pulse width modulation (PWM) frequency and a larger DC bus voltage. Nevertheless, the H-bridge inverter lacks boost function so that the inverter kVA requirement has to be increased twice with a PV voltage range of 1:2, which restricts the system power density. In addition, both configurations are not able to be immune to shoot-through faults. Therefore, the modular system meets a daunting challenge.

SUMMARY OF INVENTION

The present invention provides a scalable cascaded Z-source inverter configuration for dc-ac power conversion that can integrate distributed renewable energy sources and storages with wide voltage ranges. One embodiment of the invention in PV application is shown in FIG. 3. Single energy conversion and boost function can be achieved simultaneously. Independent MPPT for each Z-source inverter module can implement an efficient PV energy conversion. In another embodiment of the invention, the commercial low voltage GaN device is be used to facilitate modular structure due to its ultra-high frequency, small size AC filter and DC electrolyte capacitor, which reduces losses significantly and achieves high power efficiency.

The present invention is immune to shoot-through faults especially operating at high switching frequency and enhance the system reliability. A comprehensive Z-source network design is developed based on an innovative equivalent AC circuit model for the single phase PV system. Flexible and reliable control system integrated is developed to improve the PV energy harvesting capability. In particular, the invention is suitable for hybrid renewable energy sources and storages application in wide system operation range. High power density, high power efficiency, high power quality and high system reliability can be achieved.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figures 1, 2, 3:
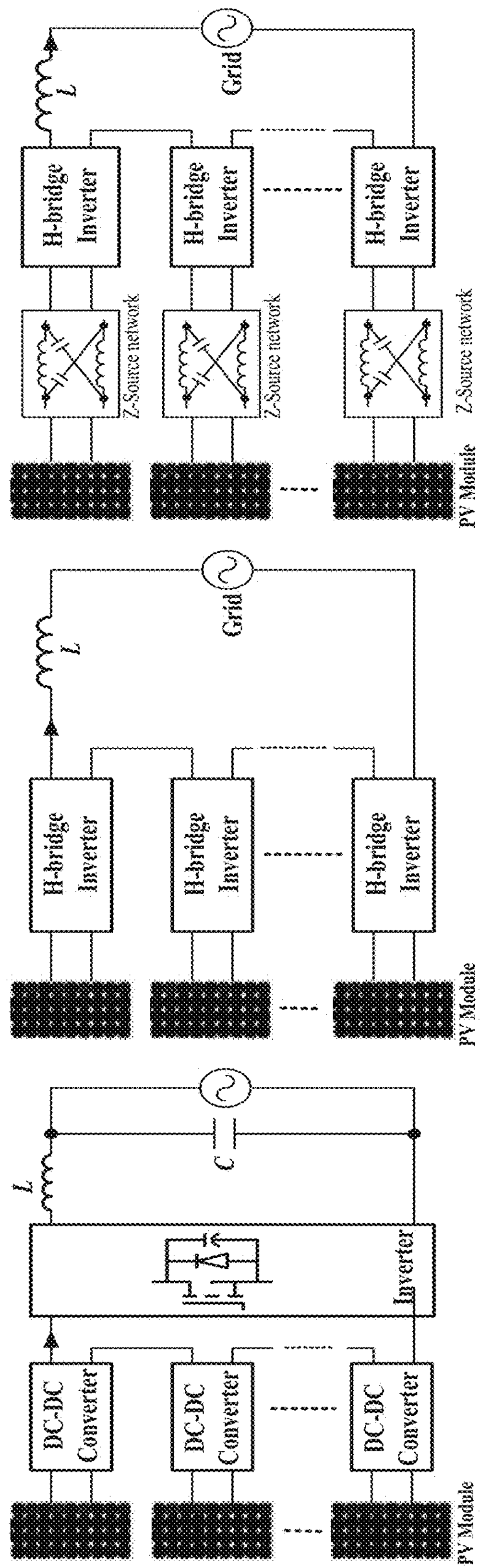
FIG. 1 is an illustration of a grid connected PV system with cascaded DC-DC converters.
FIG. 2 is an illustration of a grid connected PV system with cascaded H-bridge inverters.
FIG. 3 is an illustration of the PV system configuration with the invented cascaded Z-source inverters.
Figure 4:
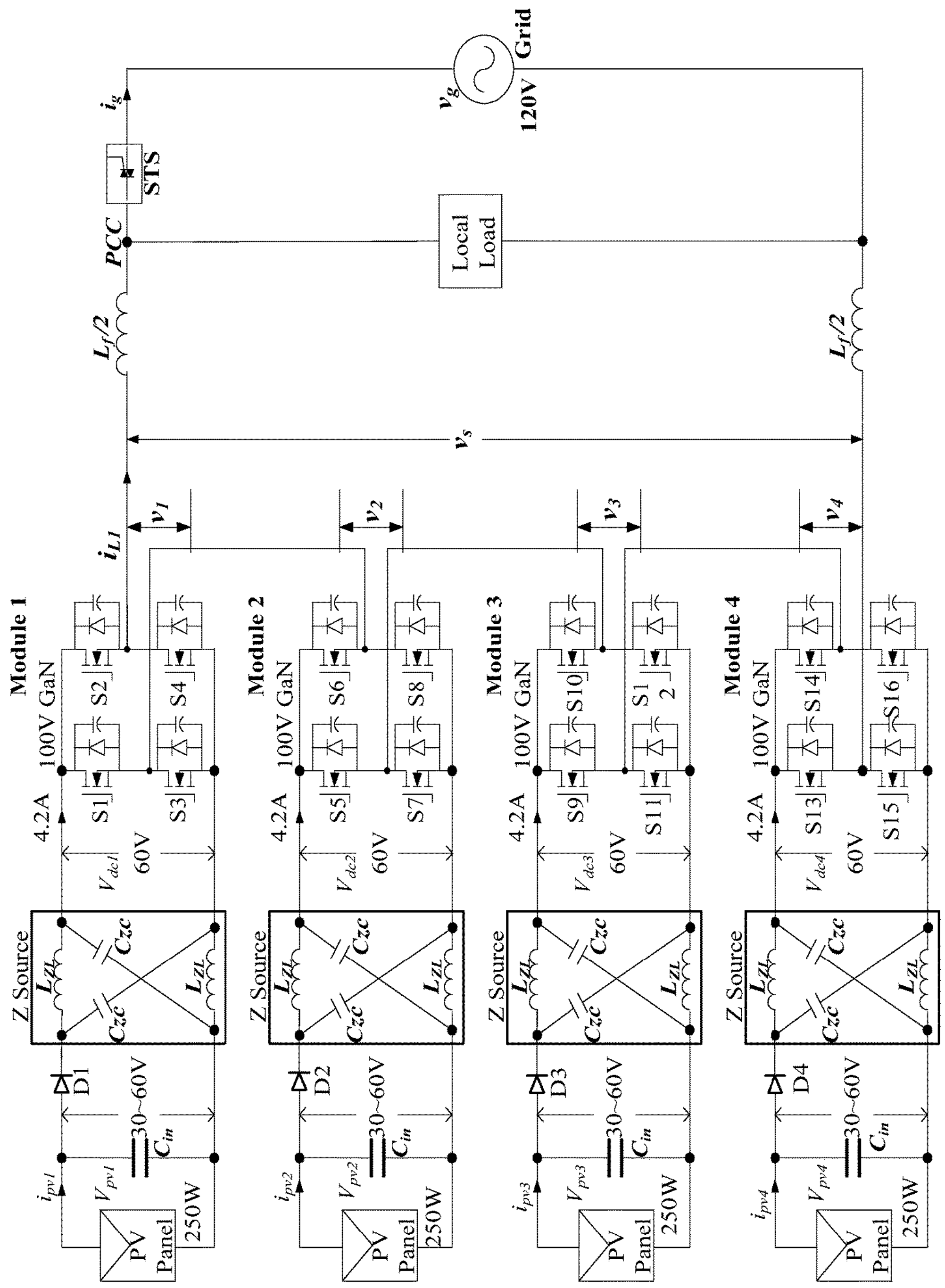
FIG. 4 is an illustration of the PV system with four cascaded Z-source inverters at 1 kW.

In one embodiment, the scalable cascaded Z-source inverter module can be applied for the 1 kW/120V single phase grid-connected PV system with 1 MHz frequency output, shown in FIG. 4. The 100V/25 A/7 mΩ GaN transistors recently introduced to the market by EPC Corporation are used in each Z-source inverter module (ZSIM). Each ZSIM is a standardized open-frame power module with 250 W. The input voltage of the PV module at maximum output power varies between 30V and 60V based on different PV manufactures. In order to generate 1 MHz operation frequency at output terminals, the switching frequency of each ZSIM is 125 kHz due to phase-shift PWM modulation method. The PV system facilitates to expand capacity to by series and paralleled inverter module. The system circuit parameters are shown in Table below.

| | Parameters | Symbol | Value |
|---|---|---|---|
| Each Z-source inverter module (ZSIM) | DC link voltage | $V_{dc1}$, $V_{dc2}$ $V_{dc3}$, $V_{dc4}$ | 60 V |
| | PV Voltage | $V_{PV1}$, $V_{PV2}$ $V_{PV3}$, $V_{PV4}$ | 30-60 V |
| | Full PV power | $P_{in1}$, $P_{in2}$ $P_{in3}$, $P_{in4}$ | 250 W |
| | Switching frequency | $f_{SW}$ | 125 kHz |
| | Z-source inductor | $L_{ZL}$ | 18 μH |
| | Z-source capacitor | $C_{ZC}$ | 15000 μF |
| | Input capacitor | $C_{in}$ | 26 μF |
| | Cascaded inverter number | n | 4 |
| Grid | Filter Inductor | $L_f$ | 100 μH |
| | Rated RMS phase voltage | $V_g$ | 120 V |

The Z-source network design is critical for the system efficiency evaluation. The Z-source inductors are useful for reducing current ripple, as well Z-source capacitors and input capacitor can handle voltage ripple. The maximum current through the inductor occurs during maximum shoot-through duty cycle, which causes maximum ripple current. In the design, 40% current ripple through the inductors during maximum power operation is chosen. The inductance can be calculated by:

$$L_{ZL} = \frac{V_{ZC}(1-M)}{2f_{sw}\Delta I_{ZL}} \tag{1}$$

Where $V_{ZC}=(V_{dc}+V_{pv\_low})/2$ is the Z-source capacitor voltage, $V_{dc}$ is the dc voltage after Z-source network, $M=V_{peak}/V_{tri}$ is modulation index, $V_{tri}$ is the carrier peak value, $f_{sw}$ is switching frequency, $\Delta I_{ZL}$ is the allowed maximum Z-source inductor current ripple.

For the single phase inverter system, the instantaneous output power includes DC component and double fundamental frequency (DFF) components. The peak to peak value of the DFF power is twice DC power, which is PV power. From the energy conservation point of view, the DFF power should be absorbed by the input capacitor and Z-source capacitors, which causes DFF voltage ripple. Since the Z-source capacitor voltage $V_{ZC}$ is much greater than input capacitor voltage $V_{pv}$, Z-source capacitors should be used to deal with the DFF power. Otherwise, the total capacitance will increase resulting in low power density. In addition, input capacitor with big capacitance will cause the phase-shift between $V_{ZC}$ and $V_{pv}$ due to the equivalent LC filter on DC side, which will increase the burden of total capacitors to handle the DFF power. Therefore, the input capacitor is used for handling most high frequency voltage ripple. The maximum high frequency voltage ripple occurs during shoot-through period and PV module only delivers power to input capacitor. In order to achieve good voltage performance, high frequency voltage ripple is limited with 1%. The capacitance can be determined by:

$$C_{in} = \frac{P_{max}(1-M)}{2f_{sw}V_{pv\_low}\Delta V_{pv\_hf}} = \frac{P_{max}(1-M)}{2f_{sw}V_{pv\_low}^2 \times 1\%} \tag{2}$$

Where $\Delta V_{pv\_hf}$ is the allowed maximum input capacitor high frequency voltage ripple.

Figure 5:
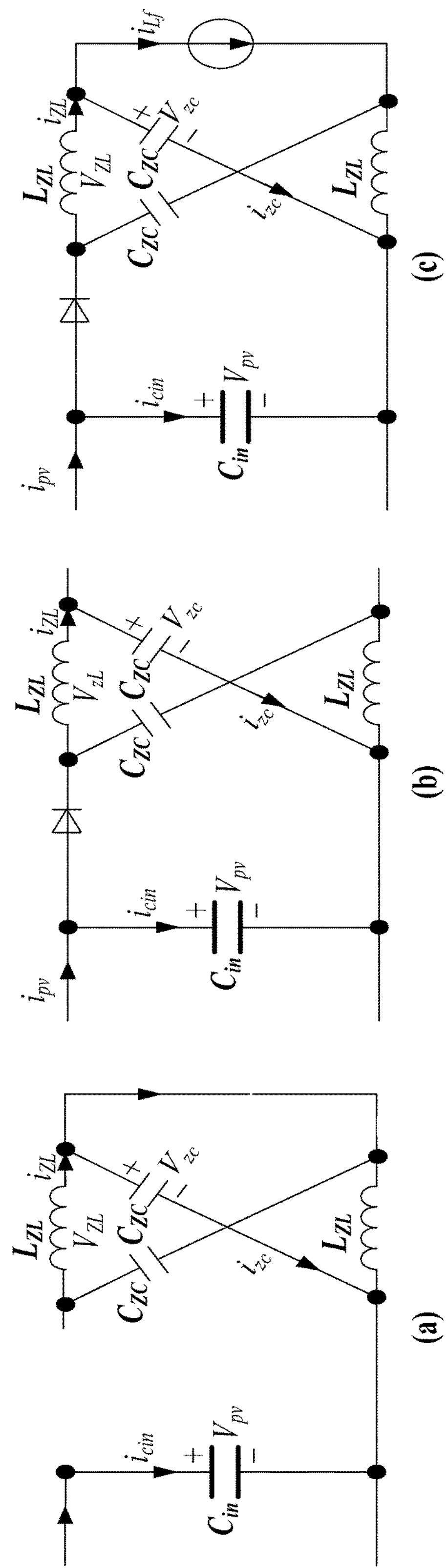
FIG. 5 is an illustration of the Z-source inverter operation mode: (a) shoot-through state; (b) traditional zero state; (c) active state.

The Z-source capacitor is used to handle the DFF voltage ripple and partly high frequency voltage ripple. In order to obtain suitable Z-source capacitance, the Z-source inverter operation mode is analyzed as shown in FIG. 5. The relationship between voltage, current and operation mode can be expressed by:

$$\begin{cases} V_{ZL} = L_{ZL}\frac{di_{ZL}}{dt} = D_{st}V_{ZC} + D_0(V_{pv} - V_{ZC}) + \\ D_1(V_{pv} - V_{ZC}) = D_{nst}V_{pv} - (D_{nst} - D_{st})V_{ZC} \\ i_{cin} = C_{\text{in}}\frac{dV_{pv}}{dt} = D_{st}i_{pv} + D_0(i_{pv} - 2i_{ZL}) + \\ D_1(i_{pv} - 2i_{ZL} + i_{Lf}) = i_{pv} - 2D_{nst}i_{ZL} + MI_g\sin^2\omega t \\ i_{ZC} = C_{ZC}\frac{dV_{ZC}}{dt} = -D_{st}i_{ZL} + D_0 i_{ZL} + \\ D_1(i_{ZL} - i_{Lf}) = -(D_{nst} - D_{st})i_{ZL} - MI_g\sin^2\omega t \end{cases} \tag{3}$$

Where $D_{st}$ is the shoot-through duty ratio; $D_{nst}=D_0+D_1$ is the non-shoot-through duty ratio; $D_0$ is tradition zero duty ratio; $D_1=M \sin \omega t$ is active state duty ratio; $i_{Lf}=I_g \sin \omega t$ is the AC filter current; $\omega=2\pi\times60$; $I_g$ is the peak value of the grid current.

Among AC and DC components included in (3), AC components are useful for the Z-source capacitors design. They can be extracted from (4) and then converted as (5):

$$\begin{cases} L_{ZL}\frac{d\tilde{i}_{ZL}}{dt} = D_{nst}\tilde{V}_{pv} - (D_{nst} - D_{st})\tilde{V}_{ZC} \\ C_{\text{in}}\frac{d\tilde{V}_{pv}}{dt} = \tilde{i}_{pv} - 2D_{nst}\tilde{i}_{ZL} - \frac{1}{2}MI_g\cos 2\omega t \\ C_{ZC}\frac{d\tilde{V}_{ZC}}{dt} = (D_{nst} - D_{st})\tilde{i}_{ZL} + \frac{1}{2}MI_g\cos 2\omega t \end{cases} \tag{4}$$

-continued $$\begin{cases} \left(\frac{D_{nst}}{D_{nst}-D_{st}}\right)\tilde{V}_{pv} = \tilde{V}_{ZC} + \left(\frac{L_{ZL}}{D_{nsht}-D_{st}}\right)\frac{d\tilde{i}_{ZL}}{dt} \\ \left(\frac{D_{nst}-D_{st}}{D_{nst}}\right)\left[\left(\frac{1}{D_{nst}-D_{st}}\right)\tilde{i}_{pv} - \left(\frac{D_{st}}{D_{nst}-D_{st}}\right)\tilde{i}_{ZL} - \left(\frac{C_{in}}{D_{nst}-D_{st}}\right)\frac{d\tilde{V}_{pv}}{dt}\right] = \\ \qquad 2\tilde{i}_{ZL} - \frac{1}{D_{nst}}\left(-\frac{1}{2}MI_g\cos 2\omega t + D_{st}\tilde{i}_{ZL}\right) \\ \left(\frac{C_{ZC}}{D_{nst}}\right)\frac{d\tilde{V}_{ZC}}{dt} = \tilde{i}_{ZL} - \left(\frac{1}{D_{nst}}\right)\left(-\frac{1}{2}MI_g\cos 2\omega t + D_{st}\tilde{i}_{ZL}\right) \end{cases} \tag{5}$$

Where $D_{nst}$=M and $D_{st}$=1−M in the worst case;

$$\tilde{i}_s = -\frac{1}{2}\frac{M}{D_{nst}}I_g\cos 2\omega t.$$

Figure 6:
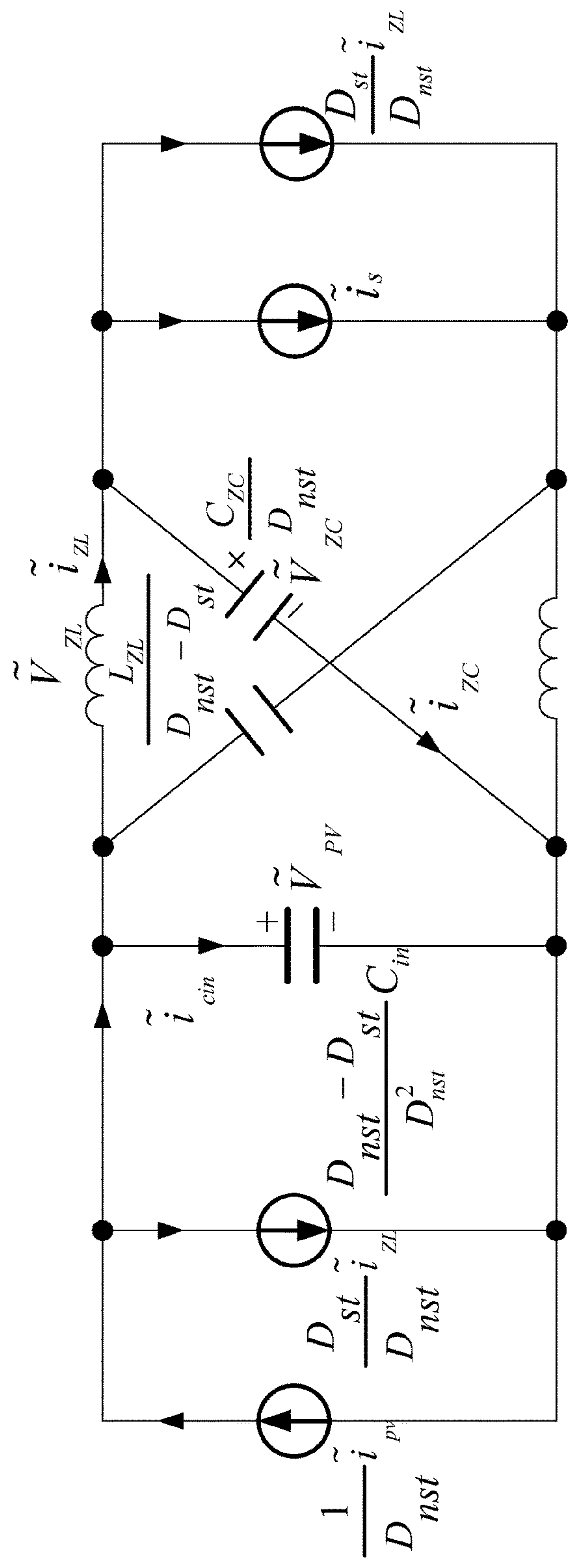
FIG. 6 is an illustration of the equivalent AC circuit model of Z-source inverter.

The equivalent AC circuit model is developed as shown in FIG. 6. Due to the DFF current ripple is absorbed by Z-source network, AC component of PV current can be ignored. The peak-peak voltage ripple on input capacitor $\Delta V_{pv}$, Z-source capacitor $\Delta V_{ZC}$ and DC link after Z-source network $\Delta V_{dc}$ can be calculated by (6).

$$\begin{bmatrix} \Delta V_{pv} \\ \Delta V_{ZC} \\ \Delta V_{dc} \end{bmatrix} = \left| \begin{bmatrix} \frac{\left(Z'_{ZL} - \frac{1}{M}Z'_{ZC}\right)Z'_{Cin}}{2Z'_{Cin} + Z'_{ZL} + \left(\frac{2M-1}{M}\right)Z'_{ZC}} \\ \frac{\left(-Z'_{ZL} - \frac{1}{M}Z'_{Cin}\right)Z'_{ZC}}{2Z'_{Cin} + Z'_{ZL} + \left(\frac{2M-1}{M}\right)Z'_{ZC}} \\ \frac{-2Z'_{ZL}Z'_{ZC} - \frac{1}{M}Z'_{Cin}Z'_{ZC} - Z'_{ZL}Z'_{Cin}}{2Z'_{Cin} + Z'_{ZL} + \left(\frac{2M-1}{M}\right)Z'_{ZC}} \end{bmatrix} MI_g \right| \tag{6}$$

$$\text{Where} \begin{cases} Z'_{Cin} = 1\Big/\left(\omega'\left(\frac{2M-1}{M^2}\right)C_{in}\right) \\ Z'_{ZC} = 1\Big/\left(\omega'\frac{1}{M}C_{ZC}\right) \\ Z'_{ZL} = 1\Big/\left(\omega'\left(\frac{1}{2M-1}\right)L_{ZL}\right) \\ \omega' = 2\pi\times 120 \end{cases};$$

Figure 8:
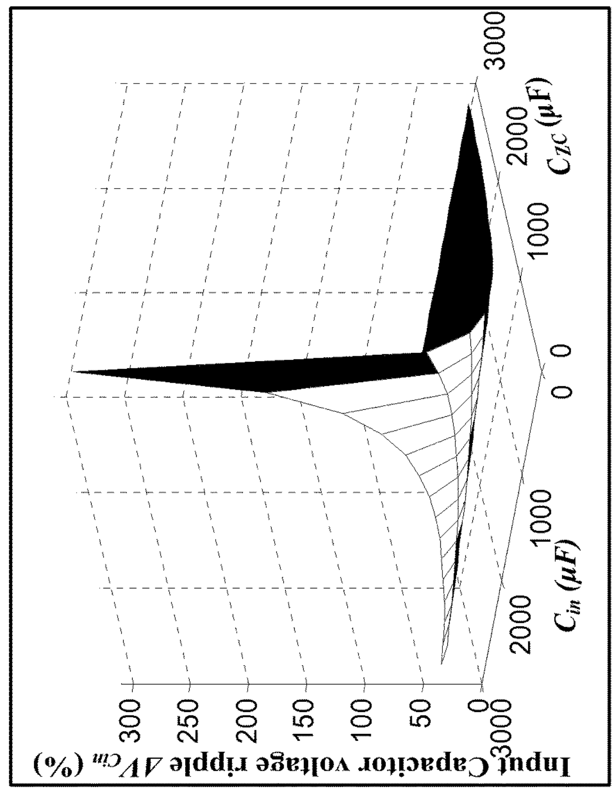
FIG. 8 is an illustration of the input capacitor voltage ripple with different input capacitance and $C_{ZC}$.
Figure 7:
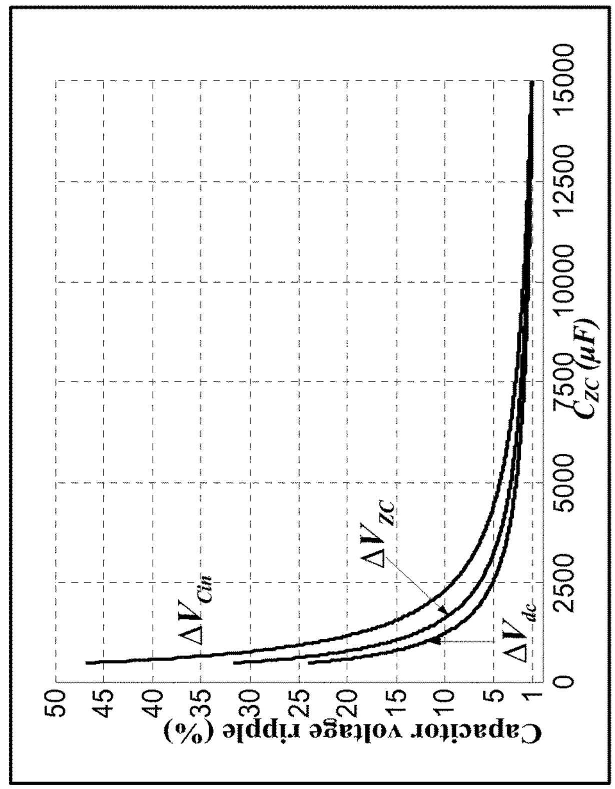
FIG. 7 is an illustration of the relationship between voltages ripples $\Delta V_{pv}$, $\Delta V_{ZC}$, $\Delta V_{dc}$ and $C_{ZC}$.

Based on (1), (2) and (6), the relationship between voltages ripples $\Delta V_{pv}$, $\Delta V_{ZC}$, $\Delta V_{dc}$ and $C_{ZC}$ can be obtained in the FIG. 7. FIG. 7 shows that the $\Delta V_{pv}$ is the highest. In order to achieve good voltage performance and maximum power point track (MPPT), $\Delta V_{pv}$ is limited with 1%. FIG. 8 shows the relationship among $C_{in}$, $C_{ZC}$ and $\Delta V_{pv}$. It can be seen that Z-source capacitors can handle the DFF voltage ripple better than input capacitor.

Figure 9:
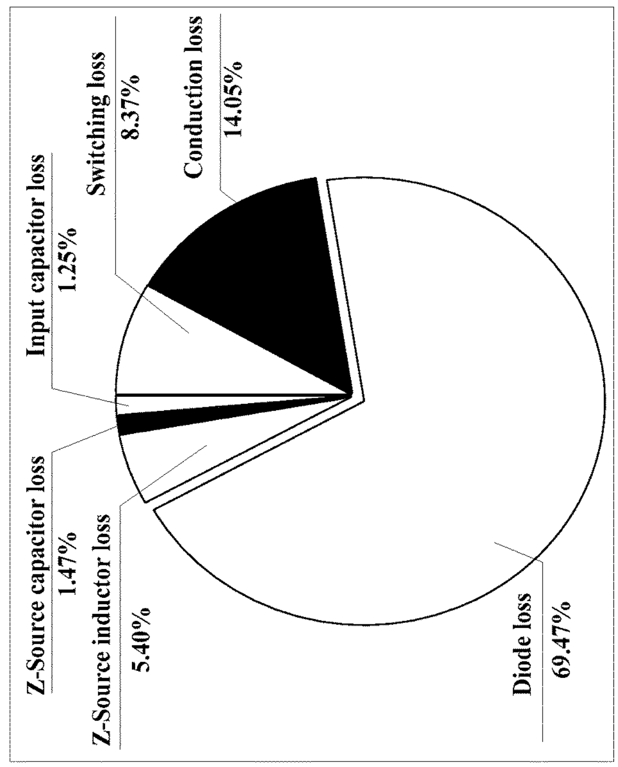
FIG. 9 is an illustration of the power loss distribution in each Z-source inverter module.
Figure 10:
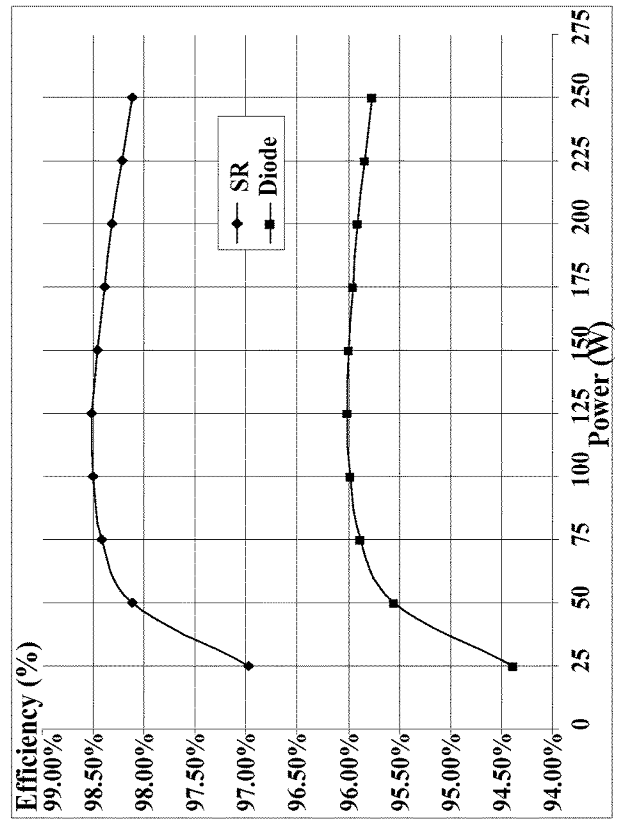
FIG. 10 is an illustration of the efficiency curves of each Z-source inverter module using diode and SR.

There are four 100V GaN devices in each ZSIM. The power loss of each 250 W module is calculated around 10 watts so the maximum efficiency is around 96% at about half of rated output power when the input diode is used. FIG. 9 shows the power loss distribution of the switching and conduction loss of GaN devices, input diode loss, the inductors and capacitors loss on Z-source network, and the input capacitor loss. Since the proposed topology allows each module to switch at only a fraction of the 1 MHz system frequency, distribution of power losses to a larger number of power devices leading to high efficiency at 1 MHz and air cooling becomes achievable. This architecture is particularly suitable for PV system where distributed PV arrays can be monitored, controlled, maintained, or replaced if necessary. If synchronous rectifier (SR) replaces the input diode to be in series with PV module, the efficiency of each Z-source inverter module is increased from 96% to 98.5%, shown in FIG. 10.

Figure 11:
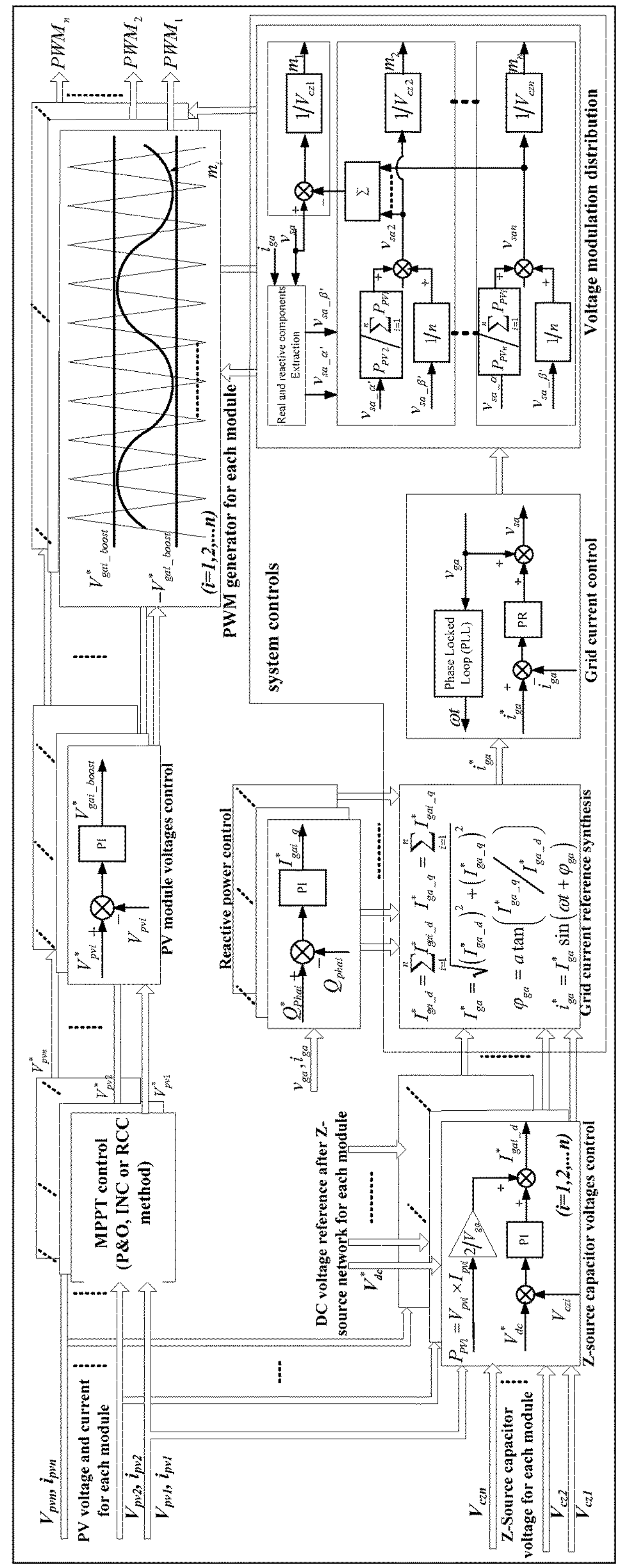
FIG. 11 is an illustration of the developed integrated control system for the PV systems.

Another embodiment of the present invention is the control system, as shown in FIG. 11. Each ZSIM receives the voltage and current sensed from each PV module and sent to the MPPT control block. The MPPT control is used to generate the output voltage reference of the PV module. MPPT control can be achieved by different methods, such as perturb and observe (P&O), incremental conductance (INC), ripple correlation control (RCC), etc. Therefore the output voltage of each PV module can be controlled accordingly to follow its own maximum power point (MPP). The PV module voltage control block generates a boost strip line o fabricate the PWM signal with boost function for each inverter module by shoot-through state. The controls of each ZSIM are independent so the MPPT of each module can be achieved even when PV modules receive different solar irradiation levels. The control system also includes the capacitor voltage control of each Z-source network and independent reactive power control. The Z-source capacitor voltage of each module is controlled to track the same reference by PI control with feedforwards so that the desired AC output voltage can be obtained. The output of capacitor voltage control contributes to the d-axis components of grid current. The reactive power control with PI controller is related to the q-axis components of grid current. Therefore, the desired gird current reference can be synthesized in the system control highlighted in dashed box in FIG. 11. In order to achieve the direct control of grid current, a proportional resonant (PR) is adopted to achieve the zero error. The output of the current control is added to the grid voltage feedforwards to generate the total inverter output voltage. However, considering the possible different real power and desired equal reactive power from each module, a real and reactive components extraction mechanism is developed to extract real and reactive power from each module. Due to the same AC current flowing through each module, the voltage distribution decides the power distribution. Therefore, the modulation index of each module can be generated based on the developed real and reactive components of output voltage. As a result, the objective voltage modulation of each inverter module is sent to PWM generation block, which will cooperate with the above boost strip line to generate the final PWM signal. If the number of inverter modules changes, the whole control remains the same except the minimum modification on "Grid current reference synthesis" and "Voltage modulation distribution" blocks. The control strategy provides a flexible and reliable operation to improve the system efficiency especially when PV modules operate under different solar irradiation levels. The same voltage on the dc-link after the Z-source network of each module can be guaranteed by the appropriate control to reduce the risk of low-frequency harmonic voltage on the total ac inverter output voltage spectrum.

The control system in the present invention may be extended to different cascaded PV inverter, such as traditional cascaded PV inverter without dc-dc converter, cascaded PV inverter with dc-dc converter. It is also flexible to be expanded to three phase cascaded inverter system.

Figure 12:
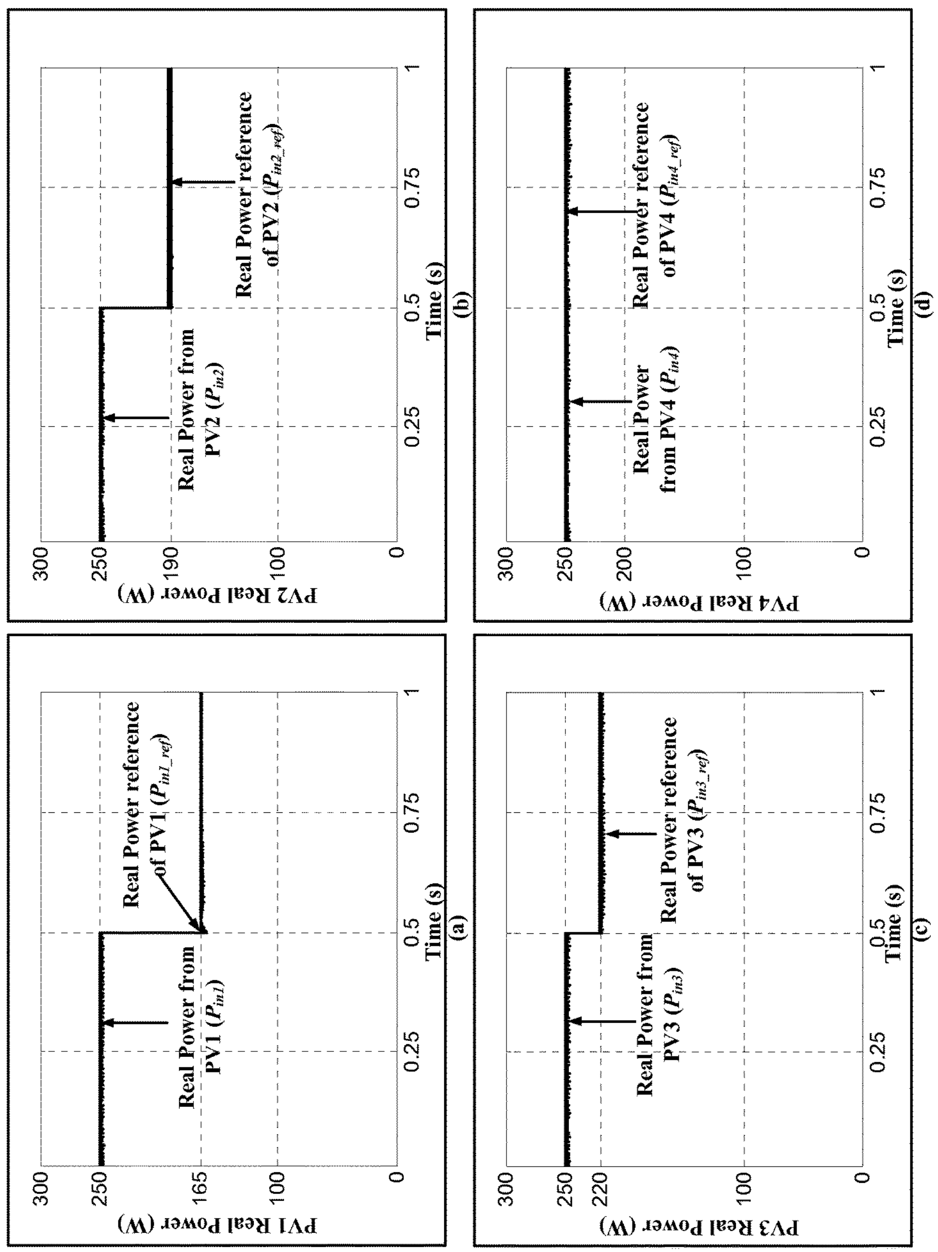
FIG. 12 is an illustration of the PV power from four PV modules: (a) PV1----$P_{in1}$ and $P_{in1\_ref}$; (a) PV2----$P_{in2}$ and $P_{in2\_ref}$; (c) PV3----$P_{in3}$ and $P_{in3\_ref}$; (d) PV4----$P_{in4}$ and $P_{in4\_ref}$.
Figures 13, 14:
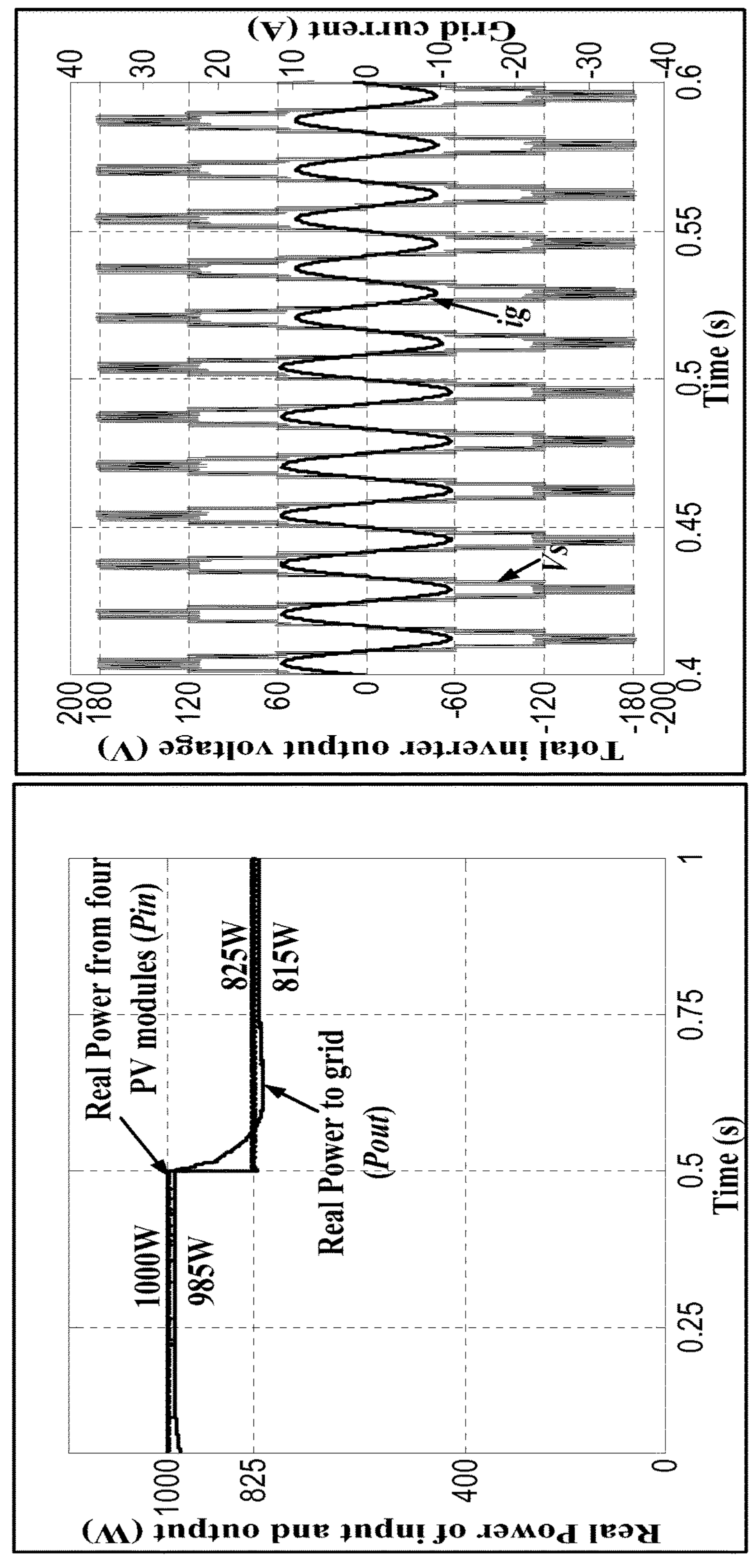
FIG. 13 is an illustration of the real power from four PV modules and to grid: $P_{in}$ and $P_{out}$.
FIG. 14 is an illustration of the total inverter output voltage and grid current: $V_S$ and $i_g$.
Figures 15, 16:
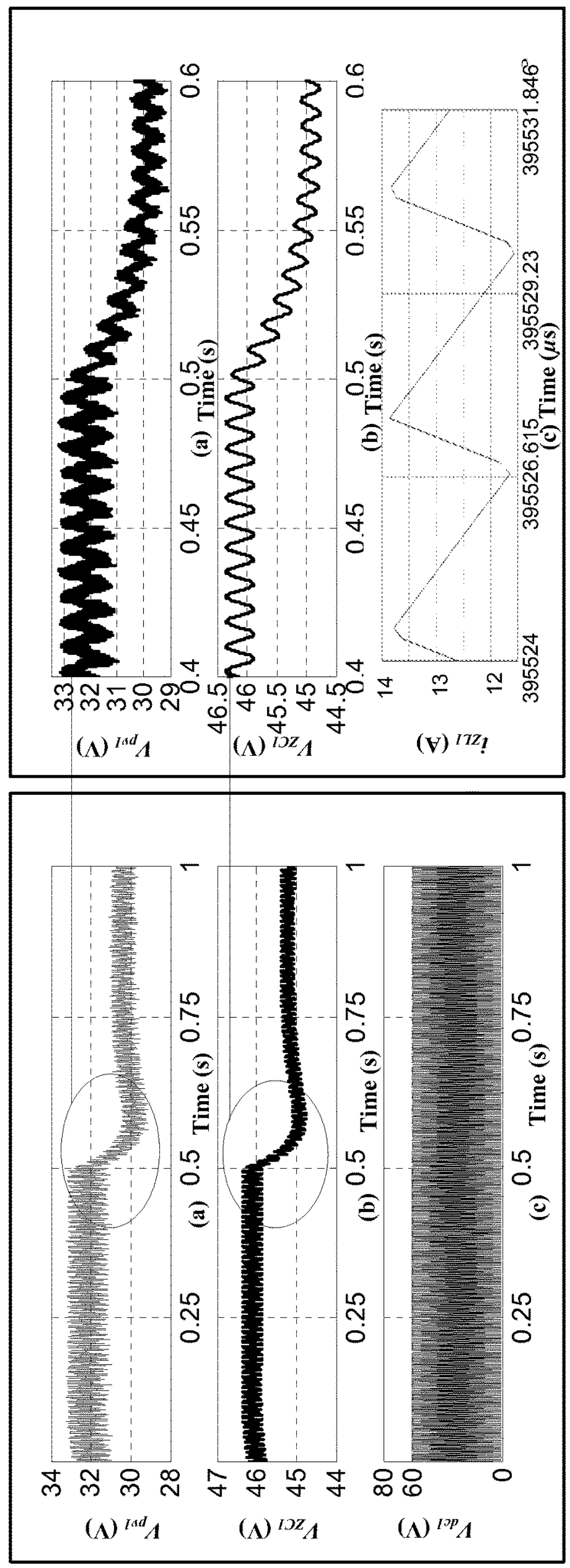
FIG. 15 is an illustration of the voltage of Z-source inverter module1: (a) $V_{PV1}$; (b) $V_{ZC1}$; (C) $V_{dc1}$.
FIG. 16 is an illustration of Voltage and current ripple: (a) Zoomed $V_{PV1}$; (b) Zoomed $V_{ZC1}$; (C) Z-source inductor current $i_{ZL1}$.

The performance of the PV system with four cascaded ZSIM is verified in Matlab/Simulink+PSIM simulation platform. FIGS. 12-16 show the simulation results when the designed Z-source network and developed control method were implemented on the PV system. As shown in FIG. 12, the temperature is 25° C. and solar irradiation is 1000 W/$m^2$ for four PV modules before 0.5 s. At 0.5 s, the solar irradiation over first three PV models (PV1, PV2, and PV3) decreases to 700 W/$m^2$, 800 W/$m^2$ and 900 W/$m^2$ respectively. The solar irradiation over fourth PV model (PV4) keeps to 1000 W/$m^2$. It is observed that the powers from PV1 ($P_{in1}$), PV2 ($P_{in2}$), and PV3 ($P_{in3}$) can be controlled to track their MMP smoothly and fast from 250 W to 165 W ($P_{in1\_ref}$), 190 W ($P_{in2\_ref}$), and 220 W ($P_{in3\_ref}$) at 0.5 s in (a-c), respectively. And the power from PV4 ($P_{in4}$) always tracks the MPP of 250 W ($P_{in4\_ref}$) regardless of the other PV power changes in (d). FIG. 13 shows the input real power from four PV modules ($P_{in}$) and the power to grid ($P_{out}$). At 0.5 s, the $P_{in}$ changes from 1000 kW to 825 W and $P_{out}$ decreases from 985 W to 815 W. In the simulation, only conduction loss of each GaN device and the loss on AC line impedance are considered. The total output voltage of the cascaded inverter ($V_S$) and grid current ($i_g$) are shown in FIG. 14. Due to the small modulation index, there is only seven-level output voltage, not nine-level. The reactive power to grid is controlled to be zero. The grid current is almost in phase with the inverter output voltage if the reactive power on AC output filter is negligible. FIGS. 12-14 show that the good performance and power quality of the PV system. FIG. 15 shows the $V_{pv1}$, $V_{ZC1}$, and $V_{dc1}$ of the first ZSIM. It can be seen that the $V_{dc1}$ can be controlled to 60V during non-shoot-through period regardless of solar irradiation variation. FIG. 16 shows $\Delta V_{pv1}$, $\Delta V_{ZC1}$ and the high frequency current ripple through inductor ($i_{LZ1}$) under different solar irradiation conditions for the first ZSIM. The current ripple is less than 40%, as well $\Delta V_{pv1}$ and $\Delta V_{ZC1}$ are less than 1%. The frequency of current ripple is 250 kHz due to phase-shift PWM method.

Figure 17:
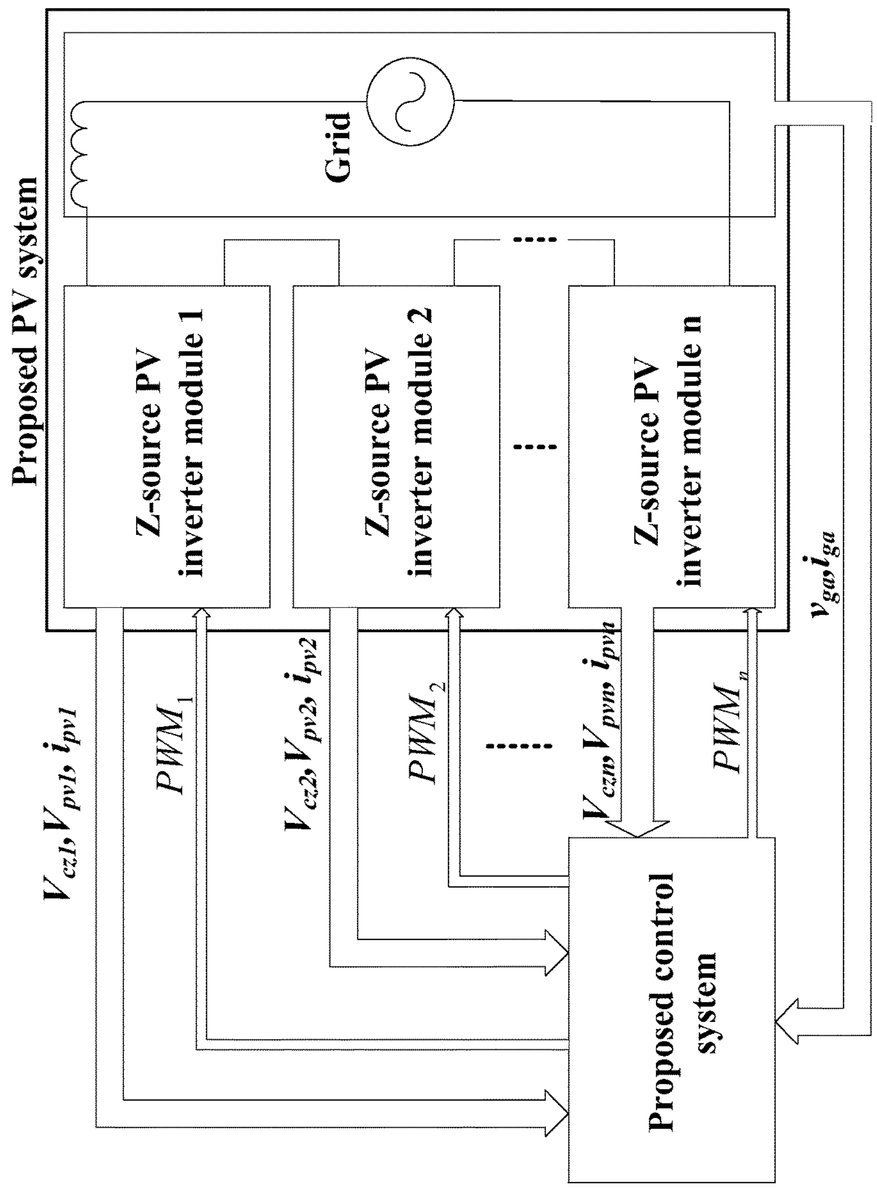
FIG. 17 is the integration of PV system and control system

The integration of PV system and control system is shown in FIG. 17. The control system is a central control system. It collects voltage and current of each PV module, and capacitor voltage of each Z-source PV inverter module, grid voltage and grid current. With the appropriate control, it generates the objective PWM signal to each PV inverter module. The PWM signal can be transmitted by fiber-optical cable to improve the system reliability. One distributed control system can be also achieved by the control objective change.

It will be seen that the advantages set forth above, and those made apparent from the foregoing description, are efficiently attained. Further, since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A Z-source inverter network comprising:

a plurality of cascaded Z-source inverter modules, each of the plurality of cascaded Z-source inverter modules comprising;

an energy source having a nominal DC voltage;

a Z-source network coupled to the energy source;

an H-bridge inverter coupled to the Z-source network;

an input diode or a synchronous rectifier coupled to be between the energy source and the Z-source network;

a control system coupled to each of the plurality of cascaded Z-source inverter modules, the control system comprising;

a maximum power point tracking (MPPT) control block to receive a voltage signal and a current signal from the energy source of each of the plurality of cascaded Z-source inverter modules and the MPPT control block to generate an output voltage reference for the energy source of each of the plurality of cascaded Z-source inverter modules;

an energy source voltage control block to receive the output voltage reference for the energy source of each of the plurality of cascaded Z-source inverter modules from the MPPT control block and the energy source voltage control block to generate a voltage control signal for each of the plurality of cascaded Z-source inverter modules, wherein the voltage control signal is used to control the shoot through duty ratio of each of the plurality of cascaded Z-source inverter modules to achieve voltage boost at each of the plurality of cascaded Z-source inverter modules;

a system control to generate and distribute a voltage modulation signal for each of the plurality of cascaded Z-source inverter modules; and a PWM signal generation block to receive the distributed voltage modulation signal for each of the plurality of cascaded Z-source inverter modules from the system control and the voltage control signal for each of the plurality of cascaded Z-source inverter modules from the energy source control block and to generate a final PWM signal with active state, traditional state and shoot-through state for each of the plurality of cascaded Z-source inverter modules.

2. The Z-source inverter network of claim 1, wherein the H-bridge inverter of each of the plurality of cascaded Z-source inverter modules comprises four GaN transistors.

3. The cascaded Z-source inverter network of claim 1, wherein the nominal DC voltage level of the energy source of each of the plurality of Z-source inverter modules is a different voltage level.

4. The cascaded Z-source inverter network of claim 1, wherein the energy source of at least one of the plurality of Z-source inverter modules is a photovoltaic energy source.

5. The Z-source inverter network of claim 1, wherein the control system further comprises:

a capacitor voltage control block to receive the voltage signal and the current signal from the energy source of each of the plurality of cascaded Z-source inverter modules and the capacitor voltage control block to generate a distributed d-axis component of grid current to a grid current reference synthesis block of the system control;

an independent reactive power control block to receive a grid voltage signal and a grid current signal and control equal reactive power generation, and to output a distributed q-axis component of the grid current to the grid current reference synthesis block of the system control; and the system control to receive the output from the capacitor voltage control block and the output from the independent reactive power control block of each Z-source inverter module, the system control further configured to synthesize a total grid current control reference to generate a total inverter output voltage, and to utilize the total inverter output voltage, the output from the capacitor voltage control block and the output from the independent reactive power control block of each of the Z-source inverter modules to generate the voltage modulation signal for each of the plurality of cascaded Z-source inverter modules.

6. The Z-source inverter network of claim 1, wherein a switching frequency of each of the plurality of cascaded Z-source inverter modules is 125 kHz, and an output operation frequency of the Z-source inverter network is 1 MHz.

7. The Z-source inverter network of claim 1, wherein the control system further comprises, a capacitor voltage control block to receive the voltage signal and the current signal from the energy source of each of the plurality of cascaded Z-source inverts modules and the capacitor voltage control block to generate a distributed d-axis component of grid current to a grid current reference synthesis block of the system control.

8. The Z-source inverter network of claim 7, wherein the control system further comprises, an independent reactive power control block to receive a grid voltage signal and a grid current signal and control equal reactive power generation, and to output a distributed q-axis component of the grid current to the grid current reference synthesis block of the system control.

9. The Z-source inverter network of claim 8, wherein the system control is further configured to receive the output from the capacitor voltage control block and the output from the independent reactive power control block of each Z-source inverter module, to synthesize a total grid current control reference to generate a total inverter output voltage and to utilize the total inverter output voltage, the output from the capacitor voltage control block and the output from the independent reactive power control block of each of the Z-source inverter modules to generate the voltage modulation signal for each of the plurality of cascaded Z-source inverter modules.

10. A control system for a cascaded inverter system comprising a plurality of cascaded inverter modules, the system comprising:

a maximum power point tracking (MPPT) control block to receive a voltage signal and a current signal from an energy source of each of the plurality of cascaded inverter modules of the cascaded inverter system and to generate output voltage reference for each of the energy sources;

an energy source voltage control block to receive the output voltage reference for each of the energy sources from the MPPT control block and the energy source voltage control block generate a voltage control signal for each of the plurality of cascaded inverter modules, wherein the said voltage control signal is used to control the shoot through duty ratio to achieve voltage boost for each of the plurality of cascaded inverter modules;

a capacitor voltage control block to receive the voltage signal and the current signal from the energy source of each of the plurality of cascaded inverter modules and the capacitor control block to generate a distributed d-axis component of grid current to a grid current reference synthesis block;

an independent reactive power control block to receive a grid voltage signal and a grid current signal and control equal reactive power generation, and to output a distributed q-axis component of the grid current to the grid current reference synthesis block;

a system control to receive the output from the capacitor voltage control block and the output from the independent reactive power control block of each Z-source inverter module, the system control to synthesize a total grid current control reference to generate a total inverter output voltage, and to distribute a voltage modulation signal for each of the plurality of cascaded Z-source inverter modules; and PWM signal generation block to receive the distributed voltage modulation signal for each of the plurality of cascaded Z-source inverter modules from the system control and the voltage control signal for each of the plurality of cascaded Z-source inverter modules from the energy source voltage control block and to generate final PWM signal with active state, traditional state and shoot-through state for each of the plurality of cascaded Z-source inverter modules.

* * * * *

UNITED STATES PATENT AND TRADEMARK OFFICE

CERTIFICATE OF CORRECTION

PATENT NO. : 9,621,073 B1
APPLICATION NO. : 13/601364
DATED : April 11, 2017
INVENTOR(S) : Liming Liu and Hui Li It is certified that error appears in the above-identified patent and that said Letters Patent is hereby corrected as shown below:

In the Claims

Column 8, Claim 1, Line 5 should read:
in series between the energy source and the Z-Source net- Column 9, Claim 7, Line 19 should read:
Z-Source inverter modules and the capacitor voltage control Signed and Sealed this
Fifth Day of September, 2017

Joseph Matal

Joseph Matal
*Performing the Functions and Duties of the*
*Under Secretary of Commerce for Intellectual Property and*
*Director of the United States Patent and Trademark Office*